Figure 1:
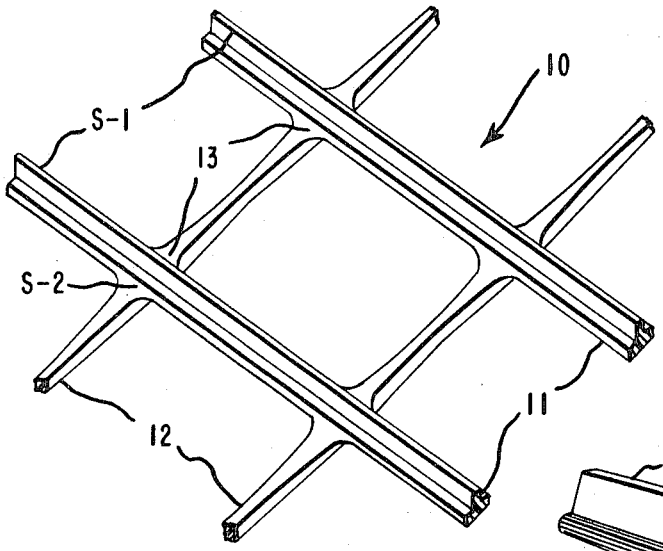
Figure 2:
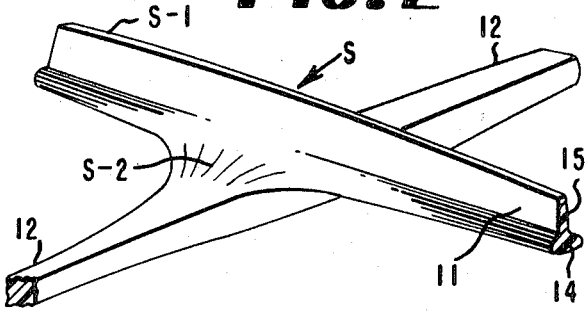
Figure 3:
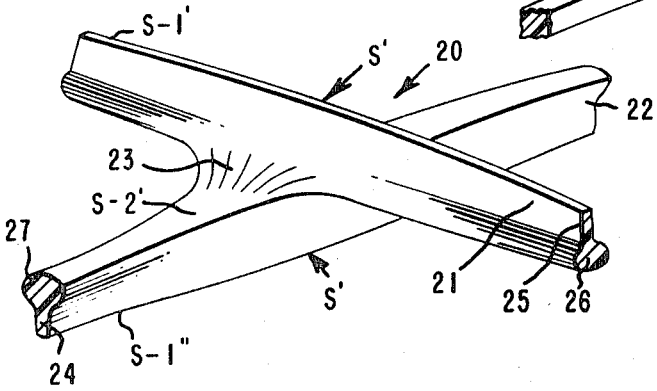
Figure 5:
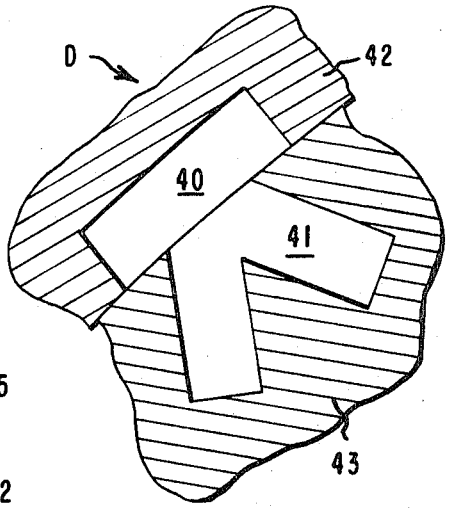
Figure 4:
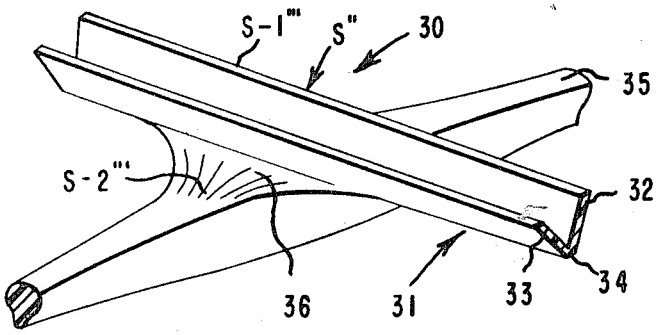

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 3, 1973

909 O.G. 7

T909,008

NETTING MEMBER

Vernon Paul Fruehauf, Williamsville, N.Y., assignor to E. I. du Pont de Nemours and Company, Wilmington, Del.

Continuation of abandoned application Ser. No. 59,124, July 29, 1970. This application June 8, 1972, Ser. No. 260,824

Int. Cl. B32b *3/10*

U.S. Cl. 161—109

1 Sheet Drawing. 9 Pages Specification

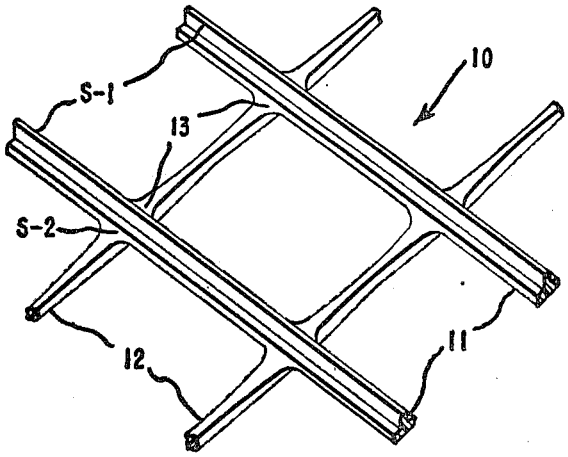

In a cleaning pad fabricated from an open-mesh fabric material so that the fabric material forms at least a part of the external surface, the improved open-mesh fabric comprising:

a thermoplastic netting member having two layers of parallel extruded strands that intersect with each other, said intersections of strands being integrally extruded joints which are complete unions of the crossing strands and at least one rib-like projection extending from each of the strands of one of the layers of parallel extruded strands with said rib-like projections extending through each of the integrally-extruded joints.

April 3, 1973 V. P. FRUEHAUF T909,008

NETTING MEMBER

Original Filed July 29, 1970

INVENTOR
VERNON P. FRUEHAUF

BY Hugo O. Suttelmeier

ATTORNEY